US010346500B2

(12) United States Patent
Childress et al.

(10) Patent No.: US 10,346,500 B2
(45) Date of Patent: Jul. 9, 2019

(54) AUTHORITY BASED CONTENT-FILTERING (71) Applicant: International Business Machines Corporation, Armonk, NY (US)

(72) Inventors: Rhonda L. Childress, Austin, TX (US); Manvendra Gupta, Brampton (CA); Stewart J. Hyman, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 14/164,578

(22) Filed: Jan. 27, 2014

(65) Prior Publication Data
US 2014/0222791 A1 Aug. 7, 2014

(30) Foreign Application Priority Data
Feb. 7, 2013 (CA) .................................... 2805221

(51) Int. Cl.
*G06F 16/953* (2019.01)
*G06F 16/958* (2019.01)

(52) U.S. Cl.
CPC .......... *G06F 16/958* (2019.01); *G06F 16/953* (2019.01)

(58) Field of Classification Search
CPC ........ G06F 17/30867; G06F 17/30864; G06F 17/3089
See application file for complete search history.

(56) References Cited

U.S. PATENT DOCUMENTS

| 5,706,452 | A  | * | 1/1998  | Ivanov  | G06Q 10/107  |
|           |    |   |         |         | 715/751      |
| 8,024,211 | B1 | * | 9/2011  | Cohen   | G06Q 10/06   |
|           |    |   |         |         | 705/7.14     |
| 8,046,346 | B2 | * | 10/2011 | Nagle   | G06F 17/30864|
|           |    |   |         |         | 705/14.11    |
| 8,108,402 | B2 |   | 1/2012  | Carter  |              |

(Continued)

OTHER PUBLICATIONS

Degele, Lynn. "Verifying the Reviewers Credentials in the Field" Taylor & Francis Editor Resources, Jul. 31, 2014, accessed from <editorresources.taylorandfrancisgroup.com/verifying-the-reviewers-credentials-in-the-field/>.*

(Continued)

*Primary Examiner* — Robert W Beausoliel, Jr.
*Assistant Examiner* — Arthur Ganger
(74) *Attorney, Agent, or Firm* — Schmeiser, Olsen & Watts, LLP; Mark Vallone (57) ABSTRACT

A method and associated system for filtering content received from a search of information. Documents are received from the search. The search is based on a search request received from a requester. A subject of each received document is determined. A contributor associated with each document received as a result of the search is determined. Credentials of each contributor are received. For each received document, a determination is made of (i) a credential score for each credential of the contributor with respect to the subject of the document and (ii) a ranking score of the contributor on the subject of the document. The ranking score is determined based on the credential scores. The received documents are filtered, by using the ranking scores, to remove at least one document from the received documents, resulting in a set of remaining documents. The set of remaining documents are returned to the requester.

13 Claims, 8 Drawing Sheets

(56) References Cited

U.S. PATENT DOCUMENTS

| | | | |
|---|---|---|---|
| 8,126,882 B2* | 2/2012 | Lawyer | G06Q 10/063 705/7.11 |
| 8,150,842 B2 | 4/2012 | Brougher et al. | |
| 8,671,056 B1* | 3/2014 | Whitney | G06Q 30/0631 705/44 |
| 8,904,040 B2* | 12/2014 | Adelman | G06Q 10/107 709/217 |
| 9,047,345 B1* | 6/2015 | Liu | G06F 17/30867 |
| 2002/0198866 A1* | 12/2002 | Kraft | G06F 17/30864 |
| 2003/0009495 A1 | 1/2003 | Adjaoute | |
| 2005/0114330 A1* | 5/2005 | Chau | G06F 17/30873 |
| 2006/0143068 A1* | 6/2006 | Calabria | G06Q 30/0603 705/26.61 |
| 2008/0005086 A1* | 1/2008 | Moore | G06F 17/30876 |
| 2009/0030897 A1* | 1/2009 | Hatami-Hanza | G06Q 10/10 |
| 2009/0125382 A1* | 5/2009 | Delepet | G06F 17/30864 705/347 |
| 2009/0165128 A1* | 6/2009 | McNally | G06Q 10/063 726/21 |
| 2010/0042612 A1 | 2/2010 | Gomaa | |
| 2010/0043058 A1 | 2/2010 | Sanders et al. | |
| 2010/0174997 A1* | 7/2010 | O'Sullivan | G06Q 10/10 715/751 |
| 2011/0225140 A1* | 9/2011 | Wu | G06F 17/30867 707/709 |
| 2011/0246456 A1 | 10/2011 | Weitz et al. | |
| 2011/0246484 A1* | 10/2011 | Dumais | G06F 17/30867 707/749 |
| 2011/0289095 A1* | 11/2011 | Minogue | G06F 17/30864 707/748 |
| 2012/0016690 A1* | 1/2012 | Ramarajan | G06F 19/345 705/2 |
| 2012/0066203 A1 | 3/2012 | Robert | |
| 2012/0158747 A1 | 6/2012 | Satow et al. | |
| 2012/0221479 A1* | 8/2012 | Schneck, III | G06Q 30/0631 705/347 |
| 2013/0018871 A1* | 1/2013 | Mehta | G06F 17/30554 707/723 |
| 2013/0218644 A1* | 8/2013 | Kasravi | G06Q 10/06 705/7.39 |
| 2013/0218795 A1* | 8/2013 | Rienzo | G06Q 10/1053 705/321 |
| 2015/0339356 A1* | 11/2015 | Myslinski | G06F 17/28 707/728 |
| 2016/0019302 A1* | 1/2016 | Hofmayer | G06Q 50/01 707/749 |

OTHER PUBLICATIONS

Greenfield et al., Effectiveness of Internet Filtering Software Products, NetAlert and the Australian Broadcasting Authority, Sep. 2001, 90 pages, CSIRO Mathematical and Information Sciences, Retrieved from the Internet: <URL: http://securimetric.net/library/software/filtereffectiveness.pdf>.

Zaragoza et al., Web Search Relevance Ranking, Zaragoza et al., Encyclopedia of Database Systems, 2009, 4 pages, Retrieved from the Internet: < URL: http://research.microsoft.com/pubs/102937/edsw-websearchrelevanceranking.pdf>.

Authors et al.: IBM, System and method to authenticate online advertisement, Original Publication Date: Dec. 3, 2009, 9 pages, IP.com No. IPCOM000190497D, Retrieved from the Internet: <URL: http://ip.com/IPCOM/000190497.

* cited by examiner

AUTHORITY BASED CONTENT-FILTERING

TECHNICAL FIELD

The present invention relates generally to publishing documents in a data processing system and more specifically to authority based content filtering of documents in the data processing system.

BACKGROUND

The Internet contains a variety of information, some of which may be categorized as relatively good information, and some as relatively bad information. But how does one discern the difference between what is good and what is bad information? Because publishing is as easy as copying files to a Web server, the files are readily available to the world. Further anyone can easily publish material, without having to have the respective material approved.

Content created by real-life authorities in a subject matter is typically considered trusted and therefore good information while other contributions that are created by sources of a less reliable authority are considered less trusted, or un-trusted, and accordingly used with an associated higher risk. The difficulty lies in determining whether any given content should be considered good and therefore trusted or bad and accordingly un-trusted, when using a source that is considered to be an authority.

Current methods for determining authority within the Internet typically use social attributes including volume of content, following of content, or even popularity to associate a level of trust or respectability with content. Internet authority is not currently based on real life authority external to the Internet environment. As an example, during a search on a topic of infant colic, a capability of filtering results using articles with one or more contributors who are pediatricians with a specified number of years of experience would be very useful, rather then only being able to filter on most popular articles.

Search engines typically provide a relevance score for search results, associating relevance of the results as compared to the search terms. The methods used in relevance ratings from search engines typically include a number of techniques. In one example, a frequency and location of keywords located within the Web page is used, wherein the fewer times the keyword appears within the body of a page, the lower score received for that keyword. In another example, the length of time the Web page has existed is used in a determination. Because new Web pages are created daily and not all pages remain for long periods of time, duration is used as an attribute. Longer lasting pages therefore tend to receive views and remain relevant. Pages with an established history tend to have more value. In a similar manner the number of other Web pages that link to a particular page is used as an indicator or usefulness or relevance.

In an example of linking pages, a ranking of how many hops a specific content is located relative to a pre-reviewed, well trusted page might also be used. The fewer hops from a trusted page, the more well trusted the content is typically considered.

Ranking provided by a third party might also be used, for example, to rank a specific topic. An author might also be ranked for trustworthiness of the author in Internet communities relevant to a particular topic. Author rank might be calculated using a number of relevant/irrelevant messages posted; a document goodness of all documents initiated by the author; a total number of documents initiated or posted by the author within a defined time period; a total number of replies or comments made by the author; and, a number of (online) groups to which the author is a member.

An agent rank might be provided wherein content creators, or agents, could be given reputation scores, which could influence rankings of pages where respective content appears, or which the agents own, edit, or endorse. Agent rank might be useful when identifying individual agents responsible for content is used to influence search ratings, when the identity of agents can be reliably associated with content, when the granularity of association can be smaller than an entire web page, enabling agents to disassociate themselves from information appearing near the information for which the agent is responsible, when attaching the same agent identity to content at multiple locations, and/or when multiple agents can make contributions to a single Web page in which each agent is associated only with a portion of content provided and an agent can disclaim association with portions of content, such as advertising, that appear on the agent's web site.

Social ranking might be used wherein authors who are more popular on one or more social media networks are considered of more authority, more likely to have readers interested in, and/or more likely to have readers trust respective associated content.

The common problem in all of the described approaches is none of the associations are directly linked to real life credentials of specific individual contributors of the content.

BRIEF SUMMARY

A method and associated system for filtering content received from a search of information. The method comprises:

receiving, by one or more processors of a data processing system, a plurality of documents from the repository as a result of a search of information stored in the repository, wherein the search is based on a search request received from a requester;

determining, by the one or more processors, a subject of each received document;

determining, by the one or more processors, a contributor associated with each respective document received as a result of the search, wherein each contributor is independently selected from the group consisting of an author of the respective document, a provider of comments on content of the respective document, a reviewer of the respective document, a provider of a rating of the content of the respective document, and combinations thereof;

receiving, by the one or more processors, a plurality of credentials of each contributor;

for each received document, determining, by the one or more processors (i) a credential score for each credential of the contributor with respect to the subject of the document and (ii) a ranking score of the contributor on the subject of the document, said determining the ranking score being based on the credential scores;

filtering, by the one or more processors, the received documents, by using the ranking scores, to remove at least one document from the received documents, resulting in a set of remaining documents; and returning, by the one or more processors, the set of remaining documents to the requester.

BRIEF DESCRIPTION OF THE DRAWINGS

For a more complete understanding of this present invention, reference is now made to the following brief descrip

DETAILED DESCRIPTION

Although an illustrative implementation of one or more embodiments is provided below, the disclosed systems and/or methods may be implemented using any number of techniques. This present invention should in no way be limited to the illustrative implementations, drawings, and techniques illustrated below, including the exemplary designs and implementations illustrated and described herein, but may be modified within the scope of the appended claims along with their full scope of equivalents.

According to one embodiment, a computer-implemented process for computer-implemented process for authority based content filtering receives a request containing search criteria from a requester, searches a content repository using the search criteria of the request to identify a set of content candidates from the content repository. A contributor authority for each contributor associated with each content candidate in a list of content candidates in the set of content candidates is queried by the computer-implemented method, wherein the contributor authority includes a mapping of a set of credentials of a contributor to subject matter and the list of content candidates is filtered and sorted by the computer-implemented method using a result from the contributor authority.

According to another embodiment, a computer program product for authority based content filtering comprises a computer recordable-type storage device containing computer executable program code stored thereon. The computer executable program code comprises computer readable and executable program code containing instructions, which upon being executed by one or more processors of a data processing system, implements the methods of the present invention, such as a method comprising: computer executable program code for receiving a request containing search criteria from a requester; computer executable program code for searching a content repository using the search criteria of the request; computer executable program code for identifying a set of content candidates from the content repository; computer executable program code for querying a contributor authority as an authority service for each contributor associated with each content candidate in a list of content candidates in the set of content candidates, wherein the contributor authority of the authority service includes a mapping of a set of credentials of a contributor to subject matter and computer executable program code for filtering and sorting the list of content candidates using a result from the contributor authority.

According to another embodiment, a computer program product of the present invention comprises one or more computer readable hardware storage devices having computer readable program code stored therein, said program code containing instructions which, upon being executed by one or more processors of a data processing system, implement the methods of the present invention.

According to another embodiment, an apparatus for authority based content filtering comprises a communications fabric; a memory connected to the communications fabric, wherein the memory contains computer executable program code; a communications unit connected to the communications fabric; an input/output unit connected to the communications fabric and a processor unit connected to the communications fabric. The processor unit executes the computer executable program code to direct the apparatus to receive a request containing search criteria from a requester; search a content repository using the search criteria of the request; identify a set of content candidates from the content repository; query a contributor authority of an authority service for each contributor associated with each content candidate in a list of content candidates in the set of content candidates, wherein the contributor authority of the authority service includes a mapping of a set of credentials of a contributor to subject matter. The processor unit executes the computer executable program code to filter and sort the list of content candidates using a result from the contributor authority.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable storage devices may be utilized. A computer-readable storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable storage device may be any tangible device that can store a program for use by or in connection with an instruction execution system, apparatus, or device.

Computer program code for carrying out operations for aspects of the present invention may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention disclosure are described herein with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage device that can direct a computer or other programmable data processing apparatus to function in a particular manner, such that the instructions stored in the computer readable storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

In one embodiment, a data processing system of the present invention comprises one or more processors, one or more memories, and one or more computer readable storage devices, wherein the one or more storage device contain program code which, upon being executed by the one or more processors via the one or more memories, implement the methods of the present invention.

Figure 1:
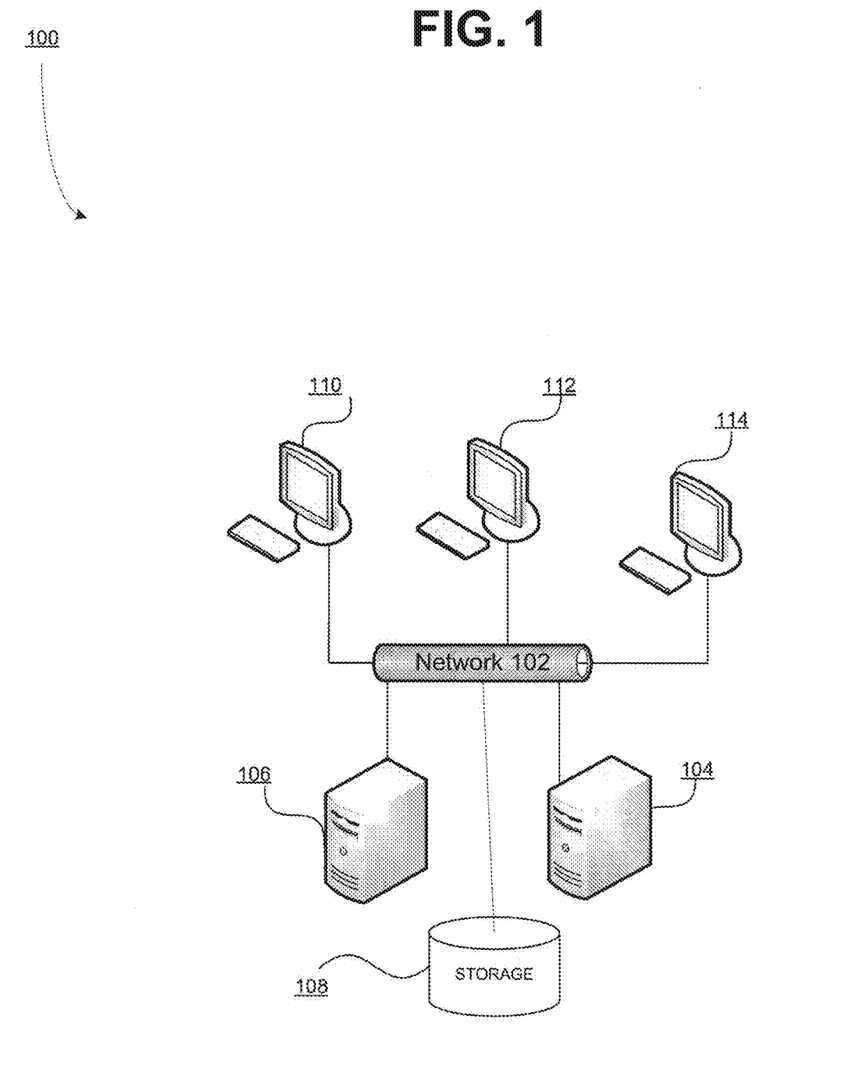
- FIG. 1 is a block diagram of an exemplary network data processing system operable for various embodiments of the present invention.
Figure 2:
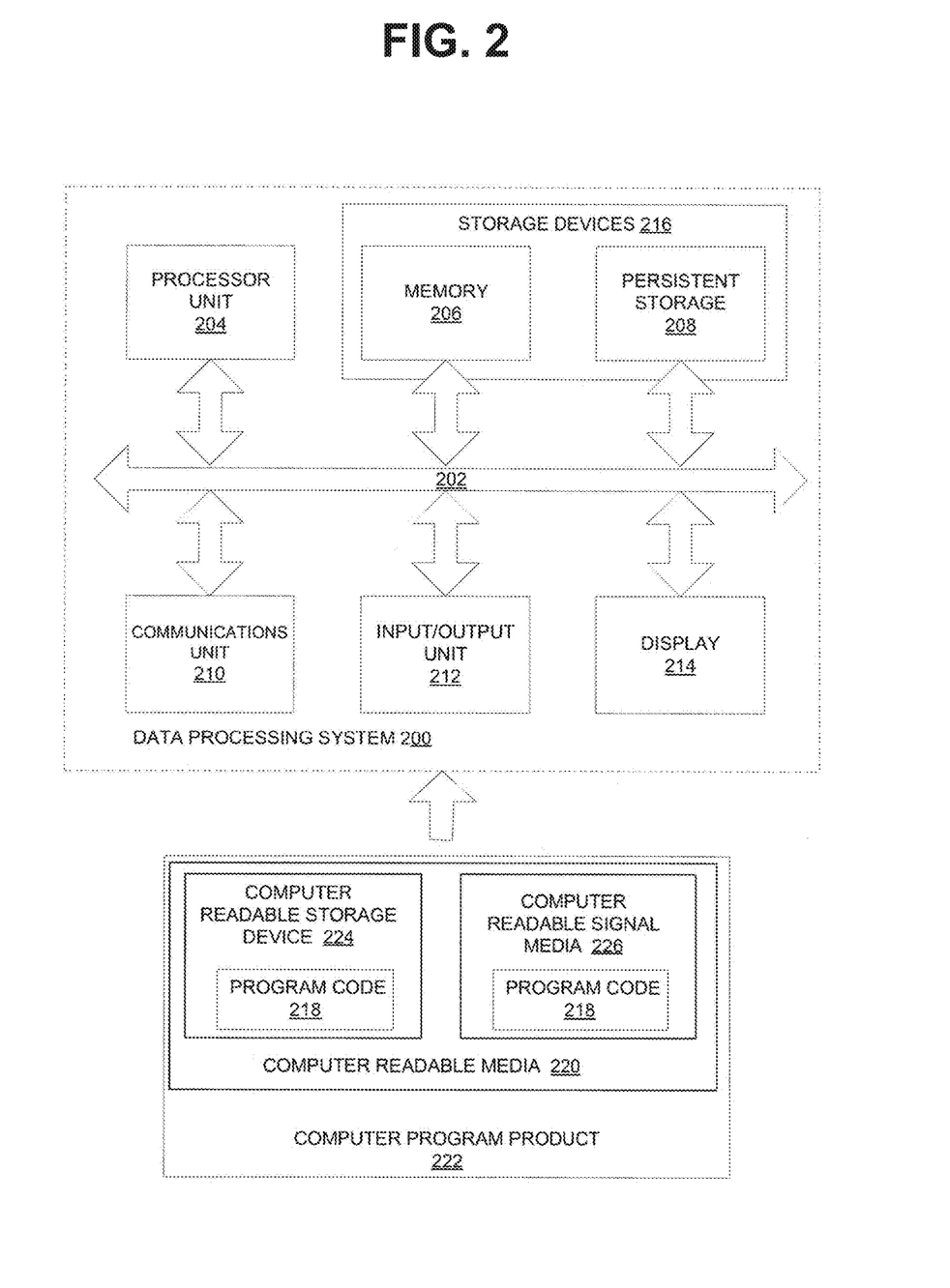
FIG. 2 is a block diagram of an exemplary data processing system operable for various embodiments of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of the present invention may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as an authority based content filtering system for use with searching documents on the Internet, boot files, operating system images, and applications to clients 110, 112, and 114. Clients 110, 112, and 114 are clients to server 104 in this example and typically request content from Internet sources obtained through network 102. Server 104 and server 106 might be used to contain one or both of a validation service or an authority service used in conjunction with the authority based content filtering system. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments an authority based content filtering system of the present invention is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software of an authority manager of the authority based content filtering system that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, including code comprising an authority manager of the authority based content filtering system and/or other suitable information either on a temporary basis and/or a permanent basis. Memory 206, in these examples, may be, for example, one or more memories of a random access memory or any other suitable volatile or non-volatile storage device. Persistent storage 208 may take various forms depending on the particular implementation. For example, persistent storage 208 may contain one or more components or storage devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs including the authority manager of the authority based content filtering system may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218, including the authority manager of the authority based content filtering system, is located in a functional form on computer readable storage device 224 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media or a computer readable storage device 224, which does not encompass propagation media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200 in the form of computer readable signal media 226. For instance, program code stored in a computer readable storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for a computer-implemented method for authority based content filtering receives a request containing search criteria from a requester. Processor unit 204 searches a content repository maintained with storage devices 216 using the search criteria of the request to identify a set of content candidates from the content repository. A contributor authority, as an authority service, for each contributor associated with each content candidate in a list of content candidates in the set of content candidates is queried by processor unit 204, wherein the contributor authority includes a mapping of a set of credentials of a contributor to subject matter and the list of content candidates is filtered and sorted by the computer-implemented method using a result from the contributor authority of an authority service. A contributor could be an original author, a provider of comments on the content, a reviewer or one who provided a rating of the content, or a person who re-shared the content with an introductory remark or peer review, or combinations thereof.

Figure 3:
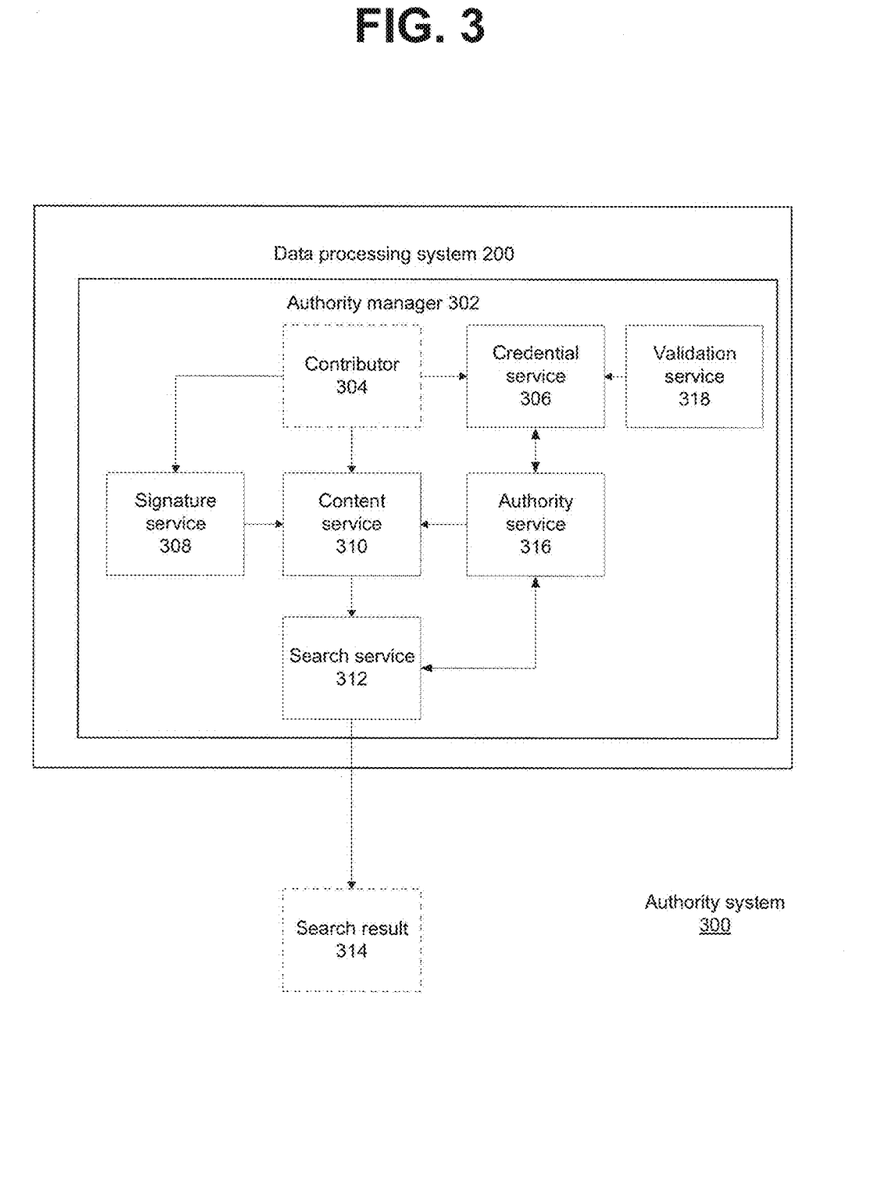
FIG. 3 is a block diagram of an authority system operable for various embodiments of the present invention.

With reference to FIG. 3 a block diagram of an authority system, within the data processing system 200, operable for various embodiments of the present invention is presented. Authority system 300 is an example of an authority based content filtering system for use with searching documents on the Internet. Documents as used throughout the present invention also refers to audio portions, video portions, files, databases and other forms of electronic data that is generated, manipulated, stored and retrieved may also referred to simply as content.

Authority system 300 leverages support of underlying systems including data processing 200 of FIG. 2 to provide typical functions of data storage and retrieval, network access and communication. Authority system 300 also provides a capability of authority-based content filtering system through a combination of functional components including credential service 306, signature service 308, content service 310, authority service 316, validation service 318, and search service 312. Authority system 300 applies equally well to an intranet within a company, an extranet between companies, and the Internet. Authority system 300 can also be used in combination with desktop systems similar to a desktop search facility. Authority system 300 provides authority based content filtering, and is accordingly applicable to the Internet, intranets, personal computers, or any other content management system.

Contributor 304 is a fundamental requirement of a publishing process because the author provides the content directly as a content creator or indirectly as a contributor in editing material and publishing the results. Contributor 304 is an indirect element of the system (hence dotted line) because the contributors are not literally in the system.

Credential service 306 provides a capability to leverage the external sources of existing methods for defining specific credentials associated with contributing authors or content providers. Credential service 306 provides a capability of accessing vetted credentials associated with specific content authors or providers. However the credentials are not specifically associated with any one document.

Credential service 306 provides one or more definitions for classifying types of education including formal education, self-taught, and experience, to indicate an expertise level for an author associated with a particular document. Other descriptors and classification types may be used as well without limitation. The credentials attest to the previously obtained experience, qualification or certifications of the specific content authors or providers associated with one or more documents. Credentials can also attest to a current title or position rather than a post occupied for a predetermined period of time. Even a short time in a higher position is indicative of capability and recognition of expertise.

In a similar manner, signature service 308 provides a capability to leverage the external sources of existing methods for signing content associated with contributing authors or content providers. Signed content assures a consumer or reader the content has not been altered by an unauthorized source since the material was provided for consumption.

Content service 310 provides a capability of a content management system to make various forms of content available to search tools and subsequently consumers of the search results. Search service 312 provides a capability of using application programming interfaces (including web crawlers) to access content maintained within content service 310 to provide content as search result 314 (dotted line indicates not direct element of the system) to requesters including users and other programs.

Typical search engine providers of search service 312 have capabilities of determining relevant subject matter of the content searched and obtained as well as methods for defining contribution and authorship of content. The search engine providers accordingly have methods for searching and filtering content.

Authority system 300 provides capabilities in the form of features previously missing from content solutions used in conjunction with the Internet. Authority service 316 provides a capability of mapping of contributor credentials to subject matter. The mapping thus providing a novel method of defining authority associated with documents once signed. First a respective author must sign the content in a document, and a category selection or determination made for the subject of the related content, to enable a determination of who is a proper authority on that subject. In one example embodiment, a subject is determined for a particular document by a content/signature service, or in another example, automatically by a content/search service.

For example, simply stating a person is a doctor and therefore can comment on any subject is insufficient justification. A cardiologist with 15 years experience is considered an authority on heart attacks rather than infant colic, and therefore should be noted as such. Creating a mapping of subjects to relevant credentials of the respective author provides a capability to quantify authority of the respective author on the subject based on possessed credentials and experience.

Authority service 316 maintains and provides standard access to authority information. The authority information is managed and made available in a consistent manner using application programming interface to search providers, content providers, credentials services, and signature services alike.

Validation service 318 provides a capability for confirming the real life credentials of contributors. For example, are the purported contributors genuine and is the respective education/work history accurate? Addition of validation service 318 enhances the trust of authority service 316. By adding validation service 318, a capability of trusting the real credentials of authors is provided and thereby provides a mechanism to rank respective associated authority on specific subject matter.

Figure 4:
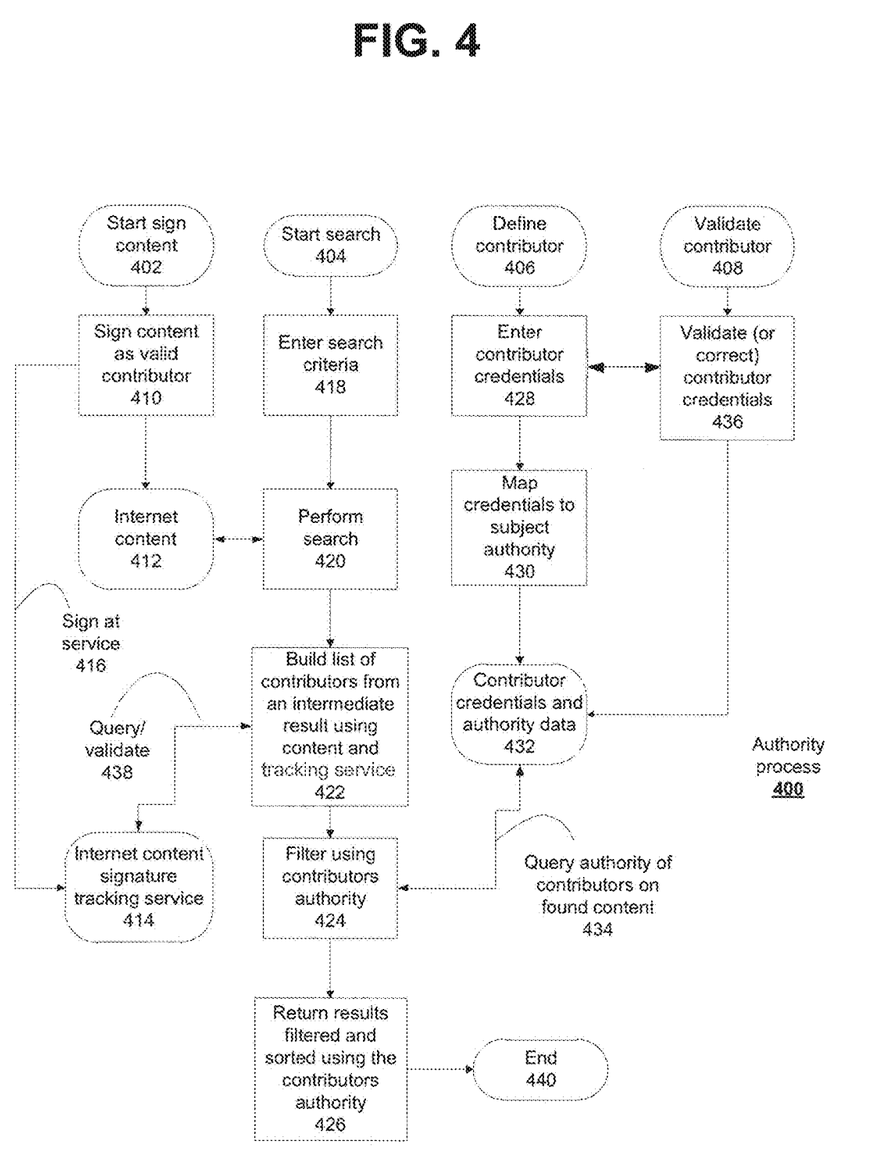
FIG. 4 is a block diagram of an overview of an authority process operable for various embodiments of the present invention.

With reference to FIG. 4 a data flow diagram of an overview of an authority process operable for various embodiments of the present invention is presented. Authority process 400 is an example of using authority system 300 of FIG. 3 for authority based content filtering for use with searching documents on the Internet.

Process 400 comprises a set of interdependent sub-processes for signing content; searching content in the context of validated contributors, a creating and validating contributor information. Process 400 as described provides validation of contributor credentials, mapping of the contributor credentials to subject matter and an authority service for maintaining authority information and providing program access to the authority information.

Start sign content (step 402) begins the content signing process in which a contributor signs content as a valid contributor (step 410). Signed content is published to the Internet as Internet content (412). An Internet content signature tracking service (step 414) ensures the signature is valid. The content signing service is also referred to as sign at service 416.

The content search sub-process begins with start search (404) in which enter search criteria (step 418) is typically received from a requester, wherein the requester can be a human user or a program entity. The search operation is executed in perform search of Internet content 412 (step 420). Intermediate search results of documents are obtained (i.e., received) from the search, based on the search request. Using the intermediate results of the search operation, process 400 in step 422 determines contributors and builds a list of contributors from the Internet content and tracking service 414 using the signed content previously published to the Internet in step 412 as Internet content. A query validate operation (step 438) is performed using information from internet content signature tracking service 414 to ensure data integrity The intermediate search results are filtered using information from the contributors authority (step 424) to remove one or more documents from the intermediate documents, based on a ranking score (discussed infra), which leaves a set of remaining documents for presentation to the requester. Process 400 returns (i.e., presents) the remaining documents (to the requester) as filtered and sorted results using the contributors authority (step 426).

A define contributor process starts (step 406) and contributor credentials are entered (step 428). This sub-process is typically performed offline involving a search of user credentials from sources including academic and enterprise affiliations as well as industry bodies including standards organizations.

A mapping of contributor credentials to subject matter is performed (step 430). A collection of mapped contributor credentials to subject matter is saved as a contributor credentials and authority data (step 432).

Content of the contributor credentials and authority data is queried in performing a filtering operation on the found content of the intermediate results of the search performed (step 434). A related sub-process of validate contributor begins (step 408) and validates (or corrects) contributor credentials (step 436). The contributor credentials were received in step 428 and are verified to be correct and accurate enabling the information to be used in subsequent steps.

Figure 5:
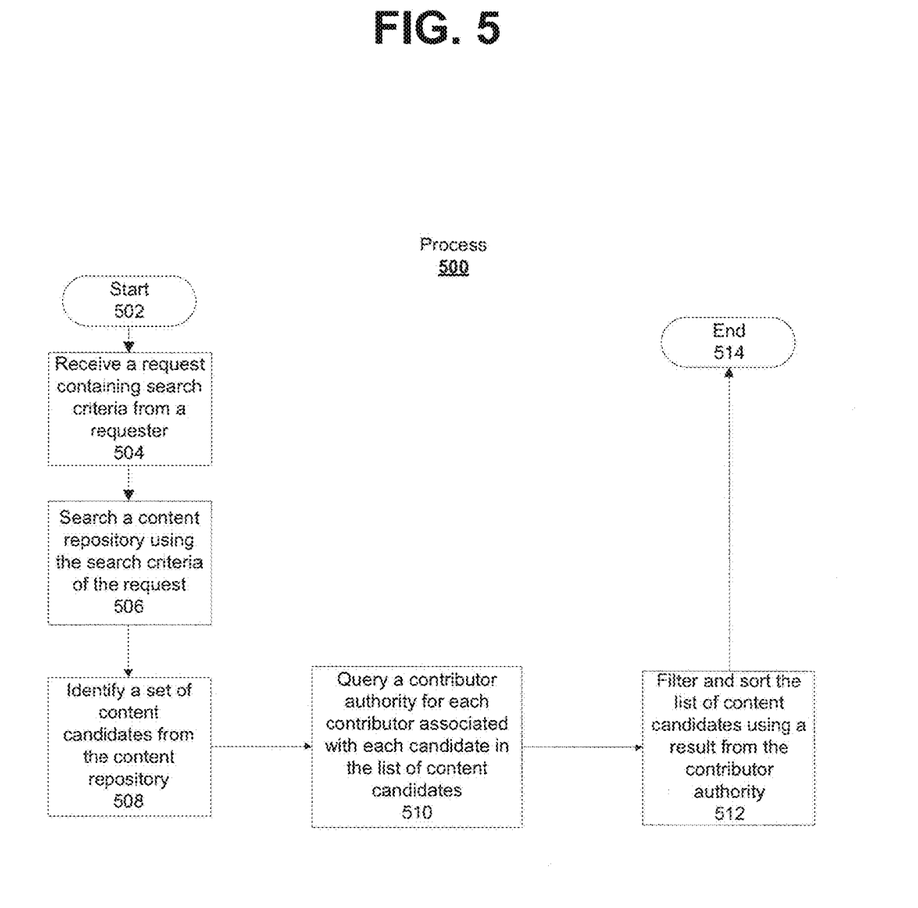
FIG. 5 is a flowchart of an authority process operable for various embodiments of the present invention.

With reference to FIG. 5 a flowchart of an authority process, within the data processing system 200, operable for various embodiments of the present invention is presented. Authority process 500 is an example of an authority based content filtering system for use with searching documents on the Internet.

Process 500 begins (step 502) and receives a request containing search criteria from a requester (step 504). A human user or a program without loss or change in function may initiate the request. The request includes search criteria used to drive the search engine processing of a content repository to generate a search result.

Process 500 searches (typically using an external search mechanism or alternatively a internally provided search mechanism) one or more content repositories using the search criteria provided in the request (step 506). Process 500 identifies a set of content candidates from the one or more content repositories (step 508). For example, the set of content candidates may provide documents of one or more web pages that satisfy the search criteria and provide an intermediate as a list of candidate web pages forming the set of content candidates.

Process 500 queries a contributor authority for each contributor associated with each candidate in the list of content candidates (step 510). The contributor authority is used to determine the veracity of a web page in the list of candidate web pages in view of the contributor information in the contributor authority.

Process 500 filters the list of content candidates using a query result from the contributor authority (step 512). The filtered list is also sorted with process 500 terminating thereafter (step 514).

Figure 6:
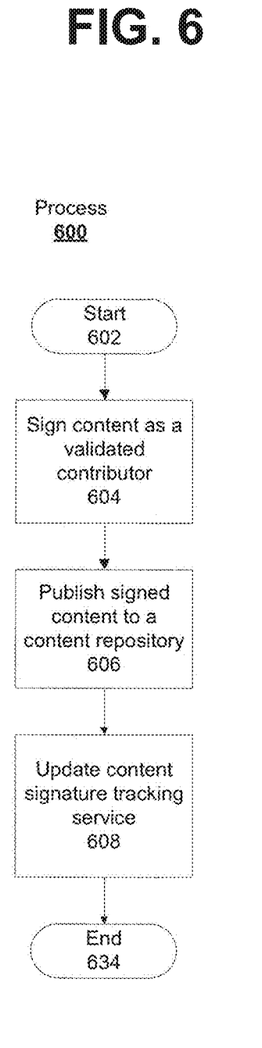
FIG. 6 is a flowchart of a signing process as used with an authority system operable for various embodiments of the present invention.

With reference to FIG. 6 a flowchart of a signing process as used with an authority system operable for various embodiments of the present invention is presented. Signing process 600 is an example of singing process used in an authority based content filtering system for use with searching documents on the Internet.

Process 600 begins (step 602) and signs content as a validated contributor (step 604). Signing for example is performed by associating and digital signature with a respective content, such as a document received from a contributor. Using the example, the contributor may be registered with a content service as well as a signing authority producing digital signature certificates.

Process 600 publishes the received and signed content to a content repository (step 606). Continuing with the current example the content repository is a set of web pages maintained on a web server. Periodically the signing authority receives requests for new and changed digital certificates, causing process 600 to update content signature tracking service (step 608) with process 600 terminating thereafter (step 610).

Figure 7:
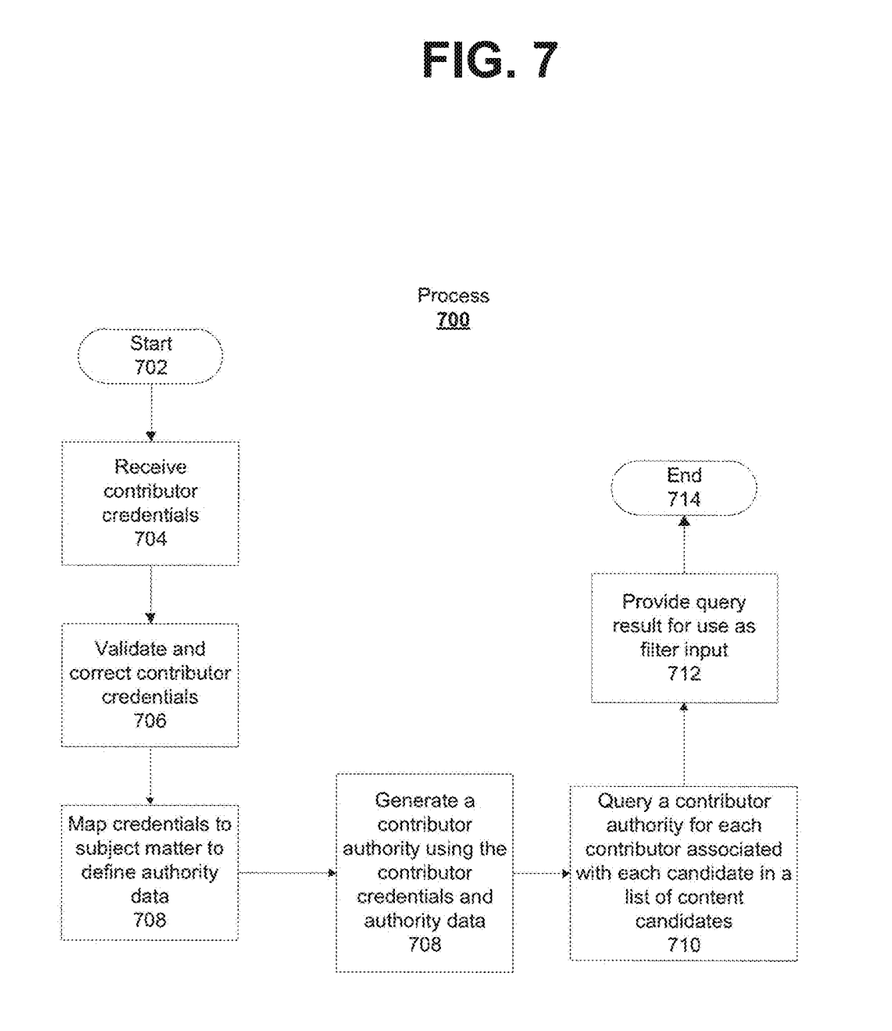
FIG. 7 is a flowchart of a contributor credential validation process of an authority system operable for various embodiments of the present invention.

With reference to FIG. 7 a flowchart of a contributor credential validation process of an authority system operable for various embodiments of the present invention is presented. Contributor credential validation process 700 is an example of a process for managing a contributor credential collection and authority data generation using an authority based content filtering system for use with searching documents on the Internet.

Process 700 begins (step 702) and receives contributor credentials (step 704). The credentials may typically be collected offline and received in conventional paper formats or digital format from accreditation services or directly from issuing bodies.

Process 700 validates and corrects contributor credentials received (step 706). Validation is the verification of the integrity of the information provided and the accuracy of the information with respect to an associated content contributor. Correction includes resolving spelling and typographic errors as well as input of previously missing information. Any mismatch causes an error and is flagged for offline corrective action.

Process 700 maps the contributor credentials to subject matter to define authority data (step 708). The mapping provides verification the contributor is a recognized authority (at some level) with respect to a particular subject matter.

Process 700 generates a contributor authority using the contributor credentials and authority data from the mapping (step 708). Process 700 queries the contributor authority for each contributor associated with each candidate in a list of content candidates (step 710). The query is responsive to a request from an associated search operation of process 500 of FIG. 5. Process 700 provides a query result for use as filter input in a calling process (step 712) and terminates thereafter (step 714).

In an example embodiment of the disclosed method a proprietary Internet service provides validation of existing credentials listings on the Internet. A number of current examples of this type of service for credentials listing for a person that could be validated are available now. Once validated by an offline service, of the example, requesting copies of certificates or degrees, integrating with universities and enterprise listings, a resulting record is considered trusted until changed. A structured format of the validated credentials, for example, an extensible markup language listing enabling elements of the record (a document) to be selectable rather then freeform, provides a capability for each selectable credential type to be assigned an authority score per subject Scoring is available now using current third party services that typical apply one or more weights in a processing of calculating a score for a topic.

Embodiments of the disclosed process do not use an authority score provided by a third party because a third party score is reliant on the weighting system applicable to the third party. In contrast with existing authority embodiments of the disclosed process use a weighting system relevant to the search requester or content reader.

A separate service defines a mapping of the applicable credentials of the author to specific subject matters (for example, starting with a highest frequency search term), and assigning or determining an authority score (i.e., a ranking score) per subject. In one example, when a person has verified attribute values (i.e., credentials) of medical doctor, a pediatrician specialization, and 10 years of experience working as a pediatrician in the named country, a credential score would be assigned to each of credentials/attributes (such as, x points for every y years of experience), for the authority the person has in related subjects. A matrix relating subjects to credentials is created providing a context of a subject for example, so that infant colic would mean that the contributor has authority comprising all three credential types, while a topic of heart surgery indicates a medical degree being relevant and accordingly assigns a ranking score based on that single indication. The ranking score is based on the credential scores (i.e., the three credential scores in the preceding example)

Having mapped credentials to authority on subject matter, a content-based meta-format is used to define where the author has contributed to content on the Internet. The specific identified content is searchable and filterable using the authority of the identified contributor for the subject matter in the content. An embodiment of the disclosed process attests to the veracity of the author of the document therefore provides a search result with high probability of the document being worth using. The content reliability has been verified using the information retrieved by the disclosed process.

Thus is presented in an illustrative embodiment a computer-implemented method for authority based content filtering. The computer-implemented method for authority based content filtering receives a request containing search criteria from a requester, searches a content repository using the search criteria of the request to identify a set of content candidates from the content repository. A contributor authority, as an authority service, for each contributor associated with each content candidate in a list of content candidates in the set of content candidates is queried by the computer-implemented method, wherein the contributor authority of the authority service includes a mapping of a set of credentials of a contributor to subject matter and the list of content candidates is filtered and sorted by the computer-implemented method using a result from the contributor authority.

Figure 8:
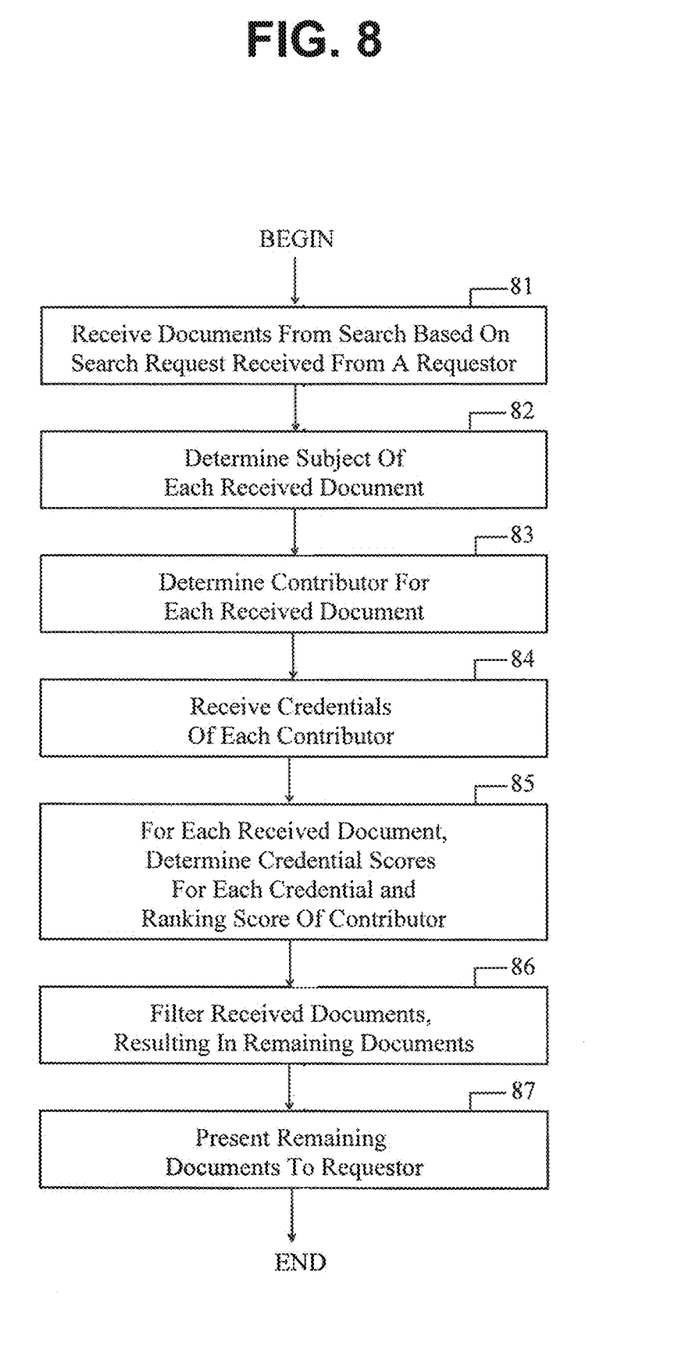
FIG. 8 is a flowchart of a method for filtering content received from a search of information operable for various embodiments of the present invention.

With reference to FIG. 8 a flowchart of a method for filtering content received from a search of information operable for various embodiments of the present invention is presented. The method of FIG. 8 includes steps 81-87.

In step 81, a plurality of documents is received from the repository as a result of a search of information stored in the repository. The search is based on a search request received from a requester.

In step 82, a subject of each received document is determined.

In step 83, a contributor associated with each respective document received as a result of the search is determined. Each contributor is independently selected from the group consisting of an author of the respective document, a provider of comments on content of the respective document, a reviewer of the respective document, a provider of a rating of the content of the respective document, and combinations thereof for each received document.

In step 84, a plurality of credentials of each contributor is received.

In step 85, for each received document, a determination is made of (i) a credential score for each credential of the contributor with respect to the subject of the document and (ii) a ranking score of the contributor on the subject of the document. The ranking score is determined based on the credential scores.

In step 86, the received documents are filtered by using the ranking scores to remove at least one document from the received documents, resulting in a set of remaining documents.

In step 87, the set of remaining documents are returned to the requester.

In one embodiment, prior to presenting the set of remaining documents to the requester, the set of remaining documents are sorted.

In one embodiment, for each received document, the credential score for each credential of the contributor is determined with respect to the subject of the document by: validating each credential of the contributor with respect to the subject of the document; and utilizing a number of years of experience associated with the contributor with for each credential of the contributor with respect to the subject of the document.

In one embodiment, the received documents are web pages.

In one embodiment, the documents are received with a digital signature associated with the subject of each document In one embodiment, the received credentials are confirmed to be accurate.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable storage device having computer executable instructions stored thereon in a variety of forms. Examples of computer readable storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for filtering content received from a search of information on the Internet, said method comprising:
   receiving, by one or more processors of a data processing system, a plurality of documents from a repository as a result of a search of information stored in the repository, wherein the search is a search of the Internet based on a search request received from a requester;
   determining, by the one or more processors, a subject of each received document;
   determining, by the one or more processors, a contributor who is associated with, and is not an author of, each respective document received as a result of the search, wherein each contributor is independently selected from the group consisting of a provider of comments on content of the respective document, a reviewer of the respective document, a provider of a rating of the content of the respective document, and combinations thereof;
   querying, by the one or more processors, each contributor as to a veracity of each respective document;
   after said querying each contributor, receiving, by the one or more processors, a communication from each contributor verifying the veracity of each respective document;
   classifying an education type of an author of each respective document as being formal education, self-taught, or experience as indicative of an expertise level of the author of each respective document, wherein said classifying comprises determining whether the education type is formal education, determining whether the education type is self-taught, and determining whether the education type is experience;
   receiving, by the one or more processors, a plurality of credentials of each contributor;
   confirming, by the one or more processors, each credential of each contributor, resulting in a confirmation that each contributor is genuine and that each credential of each contributor is accurate;
   prior to said receiving the plurality of documents, publishing to the Internet, by the one or more processors, signatures comprising signed content of each respective document signed by the contributor associated with each respective document;
   ensuring, by the one or more processors, that each signature comprising the signed content of each respective document is valid;
   mapping, by the one or more processors, the credentials of each contributor to the subject of each received document and saving, by the one or more processors, the mapped credentials of each contributor to data storage in the data processing system;
   generating, by the one or more processors, a matrix relating the subject of each received document to each mapped credential;
   for each received document, determining, by the one or more processors (i) a credential score for each credential of the contributor with respect to the subject of the document and (ii) a ranking score of the contributor on the subject of the document, said determining the ranking score being based on the credential scores;
   filtering, by the one or more processors, the received documents, by using the ranking scores, to remove at least one document from the received documents, resulting in a set of remaining documents; and
   returning, by the one or more processors, the set of remaining documents to the requester.

2. The method of claim 1, wherein, for each received document, said determining the credential score for each credential of the contributor with respect to the subject of the document comprises:
   validating each credential of the contributor with respect to the subject of the document; and
   utilizing a number of years of experience associated with the contributor for each credential of the contributor with respect to the subject of the document.

3. The method of claim 1, wherein each credential of each contributor is independently selected from the group consisting of a type of education of the contributor, previous experience of the of the contributor, a current title of the contributor, a current position of the contributor, a profession of the contributor, a specialty within the profession of the contributor, and a number of years of experience of the contributor in the specialty within the profession of the contributor.

4. The method of claim 1, wherein one of the contributors is a provider of comments on content of the respective document.

5. The method of claim 1, wherein one of the contributors is a reviewer of the respective document.

6. The method of claim 1, wherein one of the contributors is a provider of a rating of the content of the respective document.

7. A computer program product comprising one or more computer readable hardware storage devices storing computer readable program code, said program code containing instructions which, upon being executed by one or more processors of a data processing system, implement a method for filtering content received from a search of information on the Internet, said method comprising:
   receiving, by the one or more processors, a plurality of documents from a repository as a result of a search of information stored in the repository, wherein the search is a search of the Internet based on a search request received from a requester;
   determining, by the one or more processors, a subject of each received document;

determining, by the one or more processors, a contributor associated with each respective document received as a result of the search, wherein each contributor is independently selected from the group consisting of a provider of comments on content of the respective document, a reviewer of the respective document, a provider of a rating of the content of the respective document, and combinations thereof;

querying, by the one or more processors, each contributor as to a veracity of each respective document;

after said querying each contributor, receiving, by the one or more processors, a communication from each contributor verifying the veracity of each respective document;

classifying an education type of an author of each respective document as being formal education, self-taught, or experiential as indicative of an expertise level of the author of each respective document;

receiving, by the one or more processors, a plurality of credentials of each contributor;

confirming, by the one or more processors, each credential of each contributor, resulting in a confirmation that each contributor is genuine and that each credential of each contributor is accurate;

prior to said receiving the plurality of documents, publishing to the Internet, by the one or more processors, signatures comprising signed content of each respective document signed by the contributor associated with each respective document;

ensuring, by the one or more processors, that each signature comprising the signed content of each respective document is valid;

mapping, by the one or more processors, the credentials of each contributor to the subject of each received document and saving, by the one or more processors, the mapped credentials of each contributor to data storage in the data processing system;

generating, by the one or more processors, a matrix relating the subject of each received document to each mapped credential;

for each received document, determining, by the one or more processors (i) a credential score for each credential of the contributor with respect to the subject of the document and (ii) a ranking score of the contributor on the subject of the document, said determining the ranking score being based on the credential scores;

filtering, by the one or more processors, the received documents, by using the ranking scores, to remove at least one document from the received documents, resulting in a set of remaining documents; and returning, by the one or more processors, the set of remaining documents to the requester.

8. The computer program product of claim 7, wherein, for each received document, said determining the credential score for each credential of the contributor with respect to the subject of the document comprises:

validating each credential of the contributor with respect to the subject of the document; and utilizing a number of years of experience associated with the contributor for each credential of the contributor with respect to the subject of the document.

9. The computer program product of claim 7, wherein each credential of each contributor is independently selected from the group consisting of a type of education of the contributor, previous experience of the of the contributor, a current title of the contributor, a current position of the contributor, a profession of the contributor, a specialty within the profession of the contributor, and a number of years of experience of the contributor in the specialty within the profession of the contributor.

10. The computer program product of claim 7, wherein said determining the contributor comprises determining the contributor who is associated with, and is not an author of, each respective document received as a result of the search.

11. A data processing system comprising one or more hardware processors, one or more hardware memories, and one or more computer readable hardware storage devices, wherein the one or more storage device contain program code which, upon being executed by the one or more processors via the one or more memories, implement a method for filtering content received from a search of information on the Internet, said method comprising:

receiving, by the one or more processors, a plurality of documents from a repository as a result of a search of information stored in the repository, wherein the search is a search of the Internet based on a search request received from a requester;

determining, by the one or more processors, a subject of each received document;

determining, by the one or more processors, a contributor associated with each respective document received as a result of the search, wherein each contributor is independently selected from the group consisting of a provider of comments on content of the respective document, a reviewer of the respective document, a provider of a rating of the content of the respective document, and combinations thereof;

querying, by the one or more processors, each contributor as to a veracity of each respective document;

after said querying each contributor, receiving, by the one or more processors, a communication from each contributor verifying the veracity of each respective document;

classifying an education type of an author of each respective document as being formal education, self-taught, or experience as indicative of an expertise level of the author of each respective document, wherein said classifying comprises determining whether the education type is formal education, determining whether the education type is self-taught, and determining whether the education type is experience;

receiving, by the one or more processors, a plurality of credentials of each contributor;

confirming, by the one or more processors, each credential of each contributor, resulting in a confirmation that each contributor is genuine and that each credential of each contributor is accurate;

prior to said receiving the plurality of documents, publishing to the Internet, by the one or more processors, signatures comprising signed content of each respective document signed by the contributor associated with each respective document;

ensuring, by the one or more processors, that each signature comprising the signed content of each respective document is valid;

mapping, by the one or more processors, the credentials of each contributor to the subject of each received document and saving, by the one or more processors, the mapped credentials of each contributor to data storage in the data processing system;

generating, by the one or more processors, a matrix relating the subject of each received document to each mapped credential;

for each received document, determining, by the one or more processors (i) a credential score for each credential of the contributor with respect to the subject of the document and (ii) a ranking score of the contributor on the subject of the document, said determining the ranking score being based on the credential scores;

filtering, by the one or more processors, the received documents, by using the ranking scores, to remove at least one document from the received documents, resulting in a set of remaining documents; and returning, by the one or more processors, the set of remaining documents to the requester.

12. The data processing system of claim 11, wherein, for each received document, said determining the credential score for each credential of the contributor with respect to the subject of the document comprises:

validating each credential of the contributor with respect to the subject of the document; and utilizing a number of years of experience associated with the contributor for each credential of the contributor with respect to the subject of the document.

13. The data processing system of claim 11, wherein said determining the contributor comprises determining the contributor who is associated with, and is not an author of, each respective document received as a result of the search.

* * * * *